United States Patent
Ravichandran et al.

(10) Patent No.: US 12,305,601 B2
(45) Date of Patent: May 20, 2025

(54) SYSTEM AND METHOD FOR RESTARTING AN ENGINE

(71) Applicant: Ford Global Technologies, LLC, Dearborn, MI (US)

(72) Inventors: Maruthi Ravichandran, Dearborn, MI (US); Calvin Trescott, Farmington Hills, MI (US); Nicholas David Moore, Dearborn, MI (US); Rajit Johri, San Francisco, CA (US); Naginder Gogna, Northville, MI (US); Ralph Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 447 days.

(21) Appl. No.: 17/654,554

(22) Filed: Mar. 11, 2022

(65) Prior Publication Data
US 2023/0287858 A1    Sep. 14, 2023

(51) Int. Cl.
| | |
|---|---|
| *F02N 11/08* | (2006.01) |
| *B60W 10/02* | (2006.01) |
| *B60W 10/06* | (2006.01) |
| *B60W 10/08* | (2006.01) |
| *B60W 20/10* | (2016.01) |
| *B60W 20/40* | (2016.01) |
| *B60W 30/18* | (2012.01) |
| *F02N 11/04* | (2006.01) |

(52) U.S. Cl.
CPC ......... *F02N 11/0803* (2013.01); *B60W 10/02* (2013.01); *B60W 10/06* (2013.01); *B60W 10/08* (2013.01); *B60W 20/10* (2013.01); *B60W 20/40* (2013.01); *B60W 30/18063* (2013.01); *F02N 11/04* (2013.01); *B60W 2540/10* (2013.01); *B60W 2540/12* (2013.01); *F02N 2200/022* (2013.01); *F02N 2200/101* (2013.01); *F02N 2200/102* (2013.01)

(58) Field of Classification Search
None
See application file for complete search history.

(56) References Cited

U.S. PATENT DOCUMENTS

| | | |
|---|---|---|
| 8,594,913 B2 | 11/2013 | Steuernagel |
| 9,573,759 B2 | 2/2017 | Yang et al. |
| 9,731,710 B2 | 8/2017 | Gibson et al. |

(Continued)

FOREIGN PATENT DOCUMENTS

DE    102010060681 A1    5/2012

OTHER PUBLICATIONS

Ravichandran, M. et al., "Methods and System for Starting an Engine," U.S. Appl. No. 17/443,925, filed Jul. 28, 2021, 35 pages.

(Continued)

*Primary Examiner* — Lail A Kleinman
(74) *Attorney, Agent, or Firm* — David Kelley; McCoy Russell LLP

(57) ABSTRACT

Systems and methods for operating a hybrid vehicle are presented. In one example, an integrated starter/generator (ISG) is operated in a speed control mode after an engine stop request. The ISG is prevented from stopping while engine rotational speed is greater than a threshold engine rotational speed so that the engine may be restarted via the ISG.

19 Claims, 5 Drawing Sheets

(56) References Cited

U.S. PATENT DOCUMENTS

| | | |
|---|---|---|
| 10,272,907 B2 | 4/2019 | Johri et al. |
| 10,450,979 B2 | 10/2019 | Gibson et al. |
| 10,611,376 B2 | 4/2020 | Cunningham et al. |
| 10,967,865 B2 | 4/2021 | Zhao et al. |
| 2007/0124037 A1* | 5/2007 | Moran ................ B60W 10/06 701/22 |
| 2013/0296121 A1 | 11/2013 | Gibson et al. |
| 2017/0259808 A1 | 9/2017 | Makled et al. |
| 2017/0259810 A1 | 9/2017 | Zhang et al. |
| 2017/0361831 A1* | 12/2017 | Johri .................... B60W 20/15 |
| 2018/0306157 A1 | 10/2018 | Lee et al. |
| 2018/0340503 A1 | 11/2018 | Kim |
| 2019/0143961 A1* | 5/2019 | Meyer ................ B60W 10/02 701/22 |
| 2019/0376483 A1 | 12/2019 | Khafagy et al. |
| 2020/0080527 A1 | 3/2020 | Khafagy et al. |
| 2020/0378319 A1* | 12/2020 | Makkiya ............ F02N 11/0837 |

OTHER PUBLICATIONS

Ravichandran, M. et al., "Methods and System for Controlling an Engine," U.S. Appl. No. 17/449,209, filed Sep. 28, 2021, 42 pages.

Ravichandran, M. et al., "Methods and System for Reserving Torque for Engine Starting," U.S. Appl. No. 17/449,216, filed Sep. 28, 2021, 41 pages.

\* cited by examiner

SYSTEM AND METHOD FOR RESTARTING AN ENGINE

FIELD

The present description relates to methods and a system for restarting an engine that has entered a shutdown phase. The methods and system may be applied to hybrid vehicles that include an integrated starter/generator.

BACKGROUND AND SUMMARY

An engine of a hybrid vehicle may be turned off from time to time to conserve fuel. The hybrid vehicle may also provide two or more ways of restarting the engine. In particular, the hybrid vehicle may include a conventional starter that engages a flywheel to crank the engine. In addition, the hybrid vehicle may also be started via closing a driveline disconnect clutch and rotating the engine via an integrated starter/generator (ISG). While it may be desirable to start the engine in different ways, it may be a challenge to select whether the engine is to be started via the conventional starter or the ISG.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
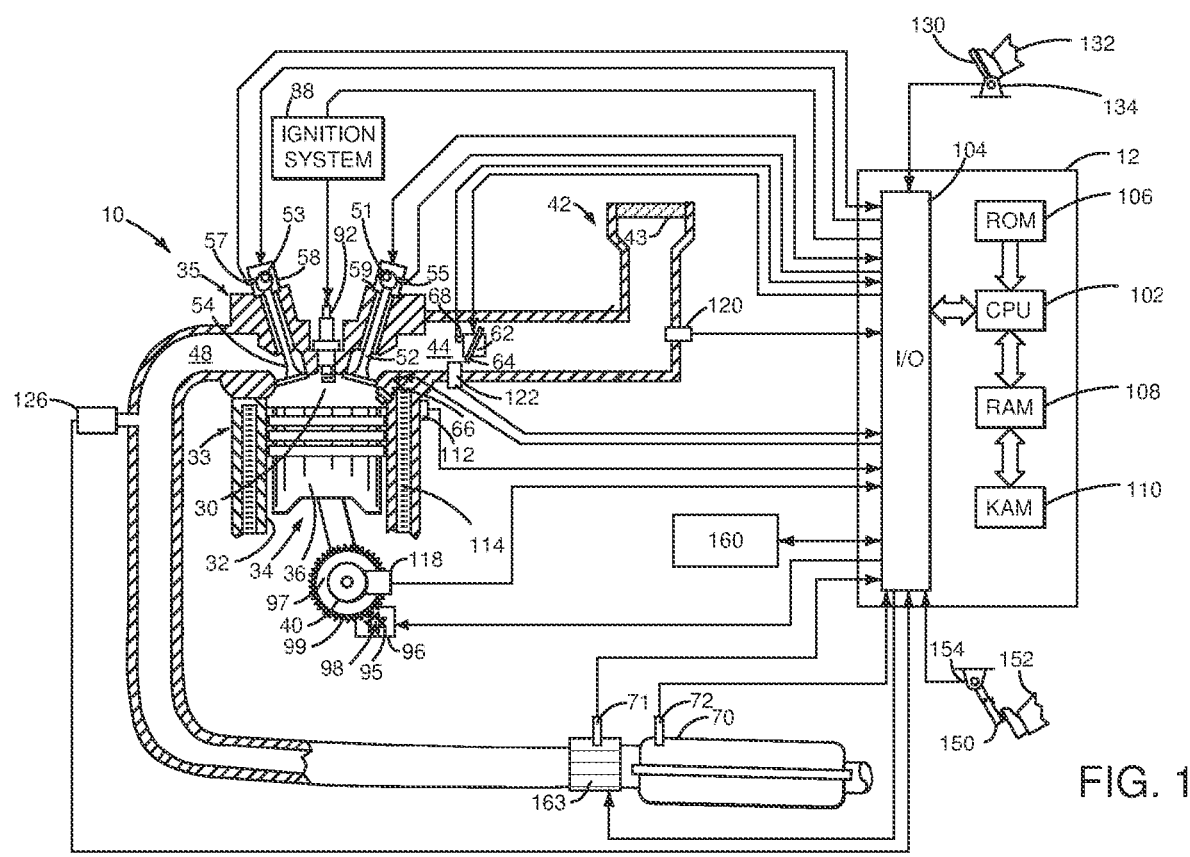
FIG. 1 is a schematic diagram of an engine.
Figure 2:
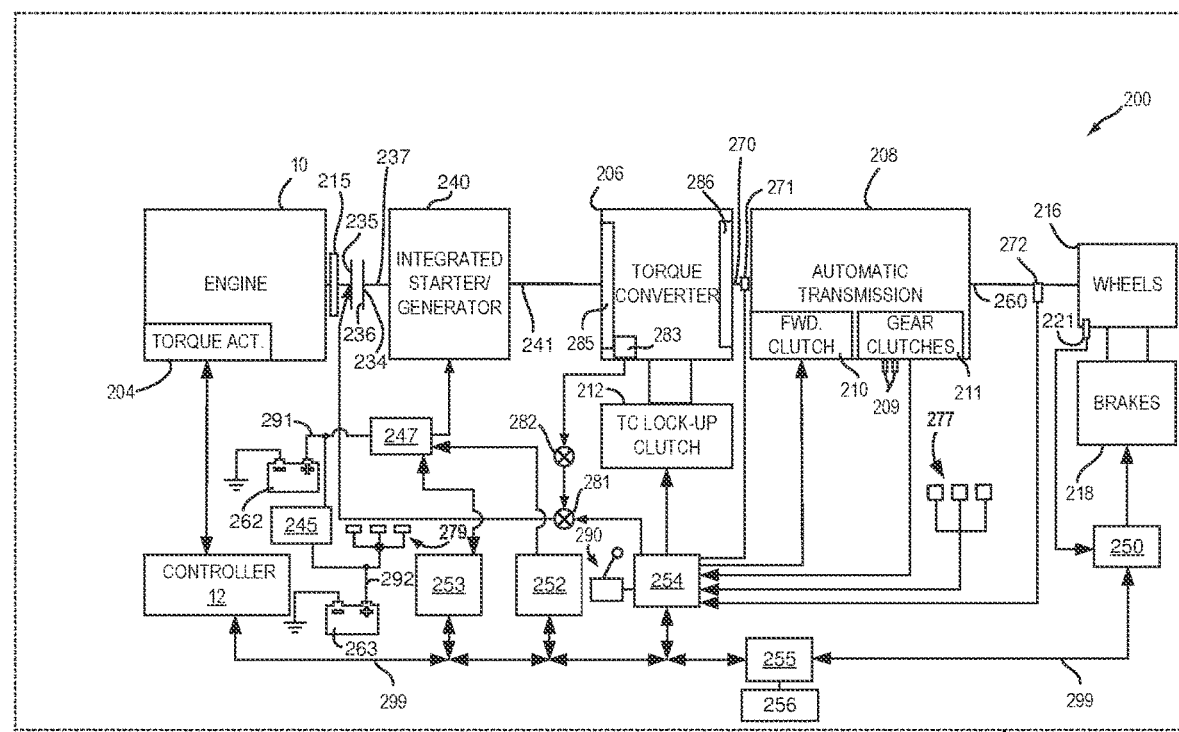
FIG. 2 is a schematic diagram of a hybrid vehicle driveline including the engine of FIG. 1.

The present description is related to improving restarting of an engine that has started to shut down. The engine may be included in a hybrid vehicle that includes two or more engine starting systems. The first engine starting system may be a conventional starter while the second starting system may be a driveline disconnect clutch and an integrated starter/generator (ISG). The engine may be of the type that is shown in FIG. 1. The engine may be part of a hybrid powertrain or driveline as shown in FIG. 2. The engine may be shut down according to the sequences shown in FIGS. 3 and 4. The engine may be shut down according to the method of FIG. 5.

A hybrid vehicle may stop rotation of an engine and an electric machine during conditions of low driver demand to conserve energy. For example, when a driver releases a driver demand pedal and applies a brake pedal as a vehicle approaches a stop light, the vehicle's engine may be stopped (e.g., stop rotation and combustion) to reduce fuel consumption and the vehicle's ISG may be stopped to reduce electric power consumption. However, if the traffic signal changes from a red state to a green state, the vehicle's driver may release the brake pedal and apply the driver demand pedal before the engine stops rotating. The ISG may be quickly run up in speed to meet a desired engine idle speed or to provide a requested amount of torque, but closing the driveline disconnect clutch may result in a driveline torque disturbance or more noise than may be desired. Thus, restarting the engine may not be as smooth as may be desired due to running up the ISG speed while simultaneously starting the engine.

The inventors herein have recognized the above-mentioned issues and have developed a method for operating a vehicle, comprising: shutting down an engine via a controller in response to and engine shutdown request; and inhibiting stopping rotation of an integrated starter/generator (ISG) after the engine shutdown request via the controller while the vehicle is stopped and a speed of the engine is greater than a threshold speed.

By inhibiting stopping of rotation of an ISG, it may be possible to provide the technical result of improving engine restarting after engine shutdown has commenced. Specifically, by maintaining ISG speed at an engine idle speed or a speed that generates a desired vehicle creep speed, the driveline disconnect clutch may be closed when speed of the ISG is not changing so that engine starting consistency may be improved. Driveline noise and vibration may be reduced when engine starting consistency is improved. Further, driveline torque disturbances may be reduced if an engine restart is generated before engine speed reaches zero because dynamic torque requests during engine starting may be reduced.

The present description may provide several advantages. In particular, the approach may improve restarting of an engine that has been shut down. Further, the approach may improve engine starting repeatability. Additionally, the approach may improve low vehicle speed control.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of electrically heated catalyst 163 and catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72. Temperature of electrically heated catalyst 163 may be monitored via temperature sensor 71.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 (e.g., gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and friction brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: a vehicle including an engine; an integrated starter/generator (ISG); a driveline disconnect clutch positioned in a driveline between the engine and the ISG; and a controller including executable instructions stored in non-transitory memory that cause the controller to inhibit stopping rotation of the ISG in response to an engine stop request while the vehicle is stopped and engine speed is above a threshold speed. In a first example, the system further comprises a brake pedal and additional instructions that cause the controller to restart the engine in response to at least partially releasing the brake pedal. In a second example that may include the first example, the system further comprises a driver demand pedal and additional instructions that cause the controller to restart the engine in response to at least partially applying the driver demand pedal. In a third example that may include one or more if the first and second examples, the system further comprises rotating the ISG at a creep speed. In a fourth example that may include one or more of the first through third examples, the system further comprises generating a creep cancel request in response to a speed of the vehicle being zero. In a fifth example that may include one or more of the first through fourth examples, the system further comprises reducing a speed of the ISG to zero in response to engine speed being zero. In a sixth example that may include one or more of the first through fifth examples, the system further comprises withdrawing the creep cancel request in response to at least partially releasing a brake pedal.

Figure 3:
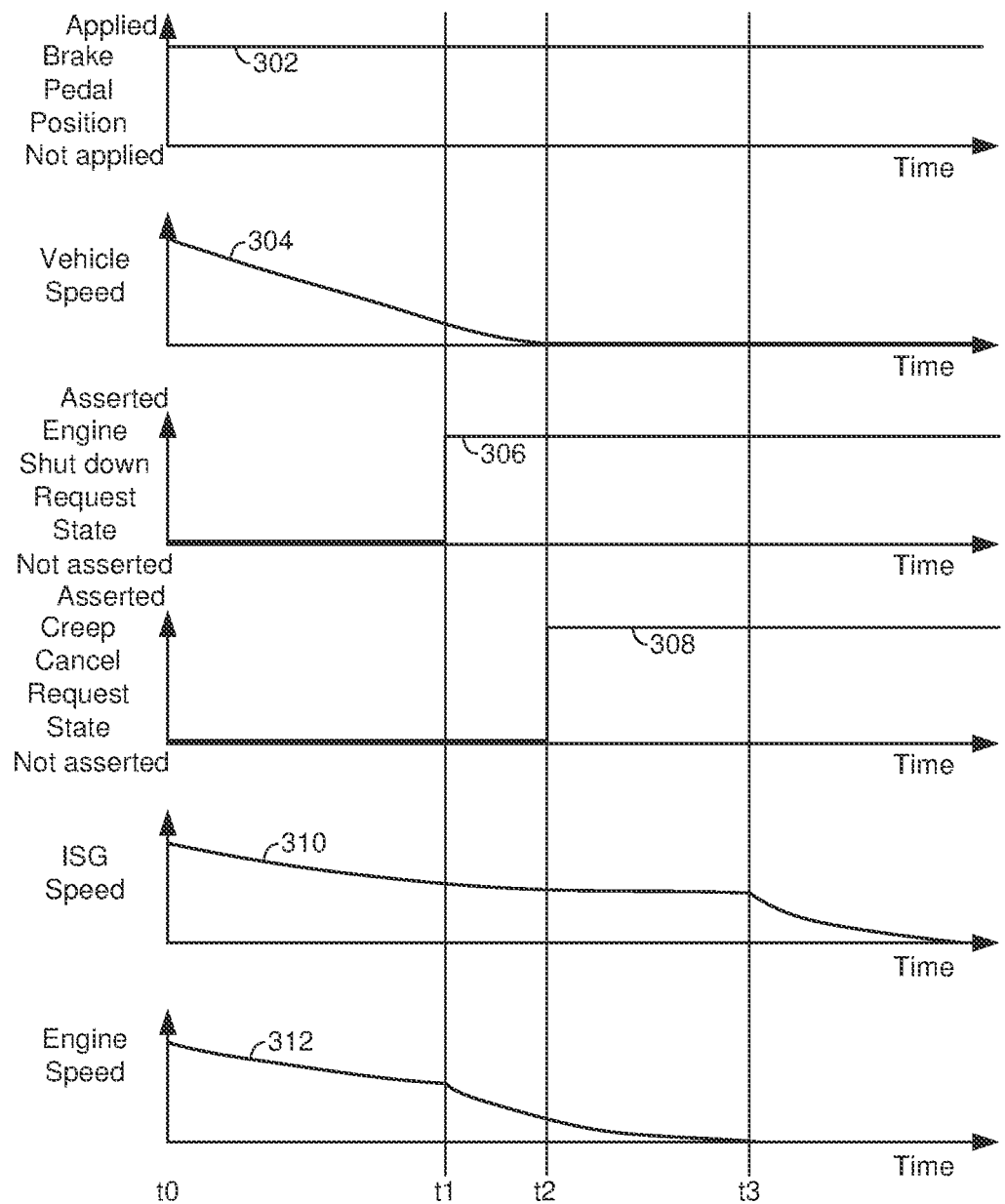
FIGS. 3 and 4 show example operating sequences for the hybrid vehicle.

Referring now to FIG. 3, a first prophetic driveline operating sequence is shown. The operating sequence of FIG. 3 may be provided via the system of FIGS. 1 and 2 in cooperation with the method of FIG. 5. The vertical lines at times t0-t3 represent times of interest during the operating sequence. The plots are time aligned. In this example sequence, an engine and ISG are completely shut down after a shutdown request.

The first plot from the top of FIG. 3 is a plot of brake pedal state versus time. The vertical axis represents brake pedal state and the brake pedal is applied when trace 302 is at a higher level near the vertical axis arrow. The brake pedal is not applied when trace 302 is at a lower level near the horizontal axis. The horizontal axis represents time and time increases from the left side of the plot to the right side of the plot. Trace 302 represents brake pedal state.

The second plot from the top of FIG. 3 is a plot of vehicle speed versus time. The vertical axis represents vehicle speed and vehicle speed increases in the direction of the vertical axis arrow. The horizontal axis represents time and time increases from the left side of the plot to the right side of the plot. Trace 304 represents vehicle speed.

The third plot from the top of FIG. 3 is a plot of an engine shutdown request state versus time. The engine shutdown request state indicates a request to shut down (e.g., cease fuel delivery and spark delivery to the engine) the engine when the engine shutdown request state trace 306 is near the vertical axis arrow. The engine shutdown request state indicates no request the shut down the engine when engine shutdown request state trace 306 is near the horizontal axis. The horizontal axis represents time and time increases from the left side of the plot to the right side of the plot. Trace 306 represents the engine shutdown request state.

The fourth plot from the top of FIG. 3 is a plot of a creep cancel request state versus time. The vertical axis represents the creep cancel request state and the creep cancel request is asserted when trace 308 is at a higher level near the vertical axis arrow. The creep cancel request state is not asserted when trace 308 is at a lower level near the horizontal axis. Trace 308 represents creep cancel request state. The creep cancel request may allow creep mode to be cancelled so that the ISG speed may be reduced to zero to conserve electric power. In creep mode, the ISG and/or engine may be operated in a speed control mode (e.g., ISG/engine speed is controlled to a desired speed, which may be constant or which may vary, while ISG/engine torque is adjusted so that the ISG/engine follows the desired speed) so that the vehicle moves at a slow speed (e.g., less than 5 kilometers/hour) when the vehicle is traveling on a flat road with the brake pedal released and the driver demand pedal not applied.

The fifth plot from the top of FIG. 3 is a plot of an ISG speed versus time. The vertical axis represents the ISG speed and the ISG speed increases in the direction of the vertical axis arrow. The horizontal axis represents time and time increases from the left side of the plot to the right side of the plot. Trace 310 represents the ISG speed.

The sixth plot from the top of FIG. 3 is a plot of engine speed versus time. The vertical axis represents engine speed and engine speed increases in the direction of the vertical axis arrow. The horizontal axis represents time and time increases from the left side of the plot to the right side of the plot. Trace 312 represents engine speed.

At time t0, the brake pedal is applied and the vehicle speed is being reduced. The engine and the ISG are activated (e.g., the engine is combusting fuel and air and the ISG is consuming electric charge). The engine shutdown request is not asserted and the cancel creep request is not asserted. The ISG speed and engine speed are equal to each other. Driver demand torque (not shown) is zero and the engine and the ISG speeds are equivalent. The engine and/or the ISG may be in a speed control mode. Vehicle speed is declining in response to the brake pedal being applied and the engine shut down is not requested. The creep cancel request is not asserted.

At time t1, an engine shutdown request is generated and the engine begins to shut down. The engine is shut down by ceasing to supply spark and fuel to the engine. The driveline disconnect clutch (not shown) is opened so that the engine speed may separate from the ISG speed. The ISG speed declines due to a low driver demand torque (not shown) and vehicle speed continues to decline. The brake pedal remains applied and the cancel creep request is not asserted.

At time t2, vehicle speed reaches zero and the brake pedal continues to be applied. The creep cancel request is asserted in response to vehicle speed being zero. The creep cancel request may allow creep mode to be cancelled so that the ISG speed may be reduced to zero to conserve electric power when engine speed reaches zero. Creep mode (not shown) remains activated, even though the creep cancel request is asserted, up to the time that engine speed reaches zero during conditions that are not indicative of an operator change of mind (e.g., the brake pedal is not released and/or the driver demand pedal is not applied). The ISG is operating in a speed control mode (not shown) and ISG speed begins to level off. Engine speed continues to decline.

At time t3, the engine speed reaches zero so the creep cancel request allows creep mode to be cancelled and the ISG speed may be commanded to zero. Alternatively, the ISG torque may be reduced to zero. The vehicle brake continues to be applied and the vehicle speed is zero. The engine shutdown request remains asserted and the creep cancel request remains asserted. The ISG speed declines and reaches zero after time t3. The engine speed remains zero.

In this way, engine speed and ISG speed may be controlled in response to an engine shutdown request and a creep cancel request. By keeping the ISG rotating at a predetermined speed (e.g., an engine idle speed) while the engine continues to rotate, the driveline may be held in a state that allows the ISG to provide torque to increase engine speed and restart the engine. Since the ISG speed is steady, engagement of the driveline disconnect clutch may yield a more consistent torque transfer across the driveline disconnect clutch. As a result, driveline torque disturbances during engine restarts may be reduced.

Figure 4:
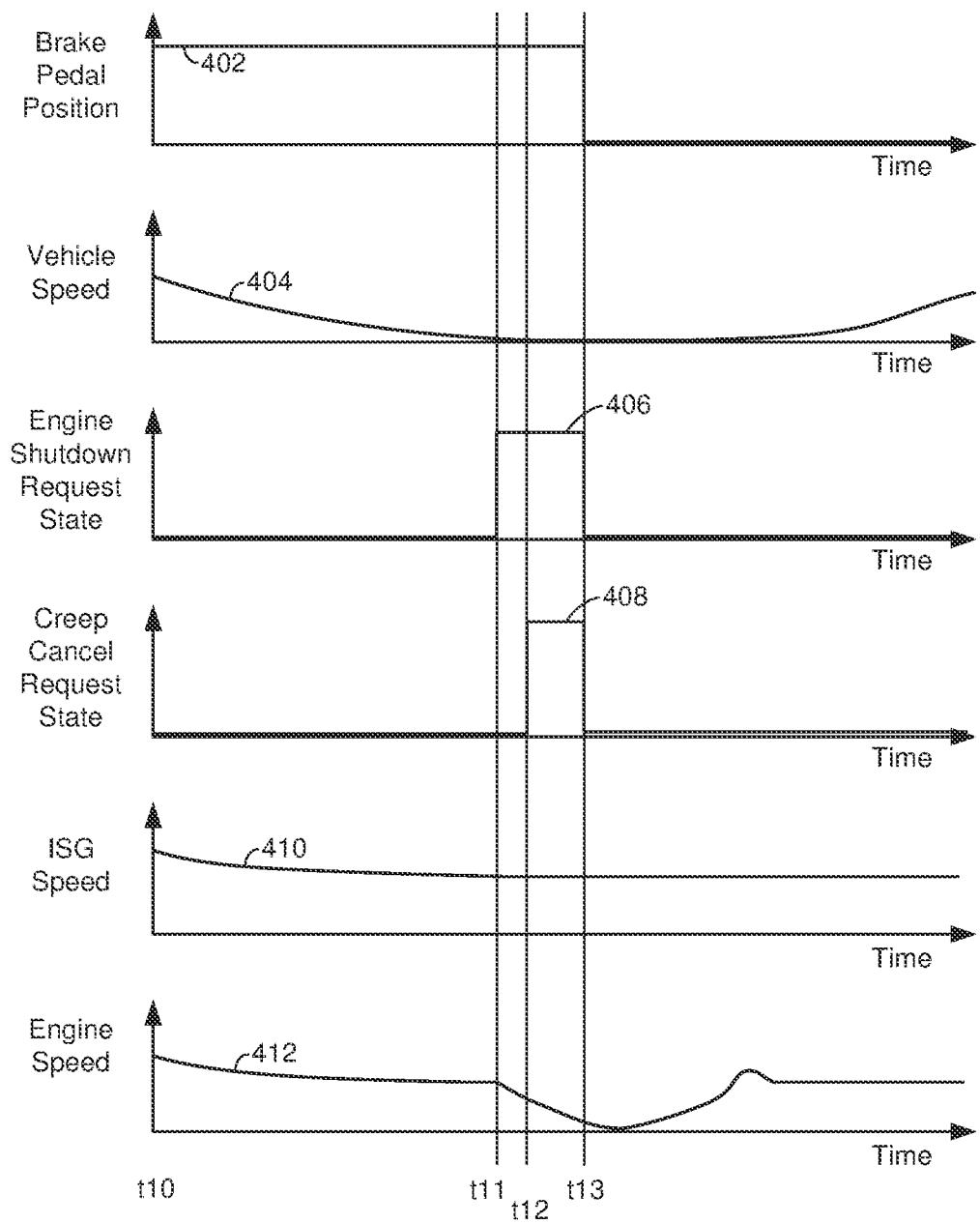

Referring now to FIG. 4, a second prophetic driveline operating sequence is shown. The operating sequence of FIG. 4 may be provided via the system of FIGS. 1 and 2 in cooperation with the method of FIG. 5. The vertical lines at times t10-t13 represent times of interest during the operating sequence. The plots are time aligned. The plots of variables in FIG. 4 include the same variables as previously discussed in the description of FIG. 3. Therefore, for the sake of brevity, the descriptions of the plots are omitted.

At time t10, the engine and the ISG are activated. The brake pedal is applied and the vehicle speed is decreasing. The engine shutdown request is not asserted and the creep cancel request is not asserted. The ISG and engine speed are equal and decreasing as vehicle speed decreases.

At time t11, an engine shutdown request is generated while the brake pedal is applied. The engine shutdown request causes spark and fuel delivery to the engine to cease (not shown) and the driveline disconnect clutch to open (not shown). This allows the ISG speed to continue at its previous level as engine speed declines. The vehicle speed continues to decline and the creep cancel request is not asserted.

At time t12, the creep cancel request is asserted in response to the vehicle speed being equal to zero. The brake pedal remains in an applied state and the engine shutdown request remains asserted. The ISG speed continues at a middle level and the engine speed moves toward zero.

At time t13, the brake pedal is released, which may be inferred as a change of mind by the vehicle operator as a desire to no longer totally stop the vehicle and its propulsion sources (e.g., the engine and the ISG). Since engine speed is not zero when the brake pedal is released, the driveline disconnect clutch begins closing (not shown) so that ISG torque may be transferred to the engine to increase engine speed so that the engine may be restarted. The engine shutdown request and the creep cancel request are withdrawn. ISG torque (not shown) is increased to maintain ISG speed and to increase engine speed. The engine speed increases shortly after time t13 and the engine is subsequently supplied with fuel and spark so that the engine is restarted.

In this way, an engine may be restarted after engine shut down begins but before engine speed is zero so that the engine may be started sooner. By keeping the ISG speed at a predetermined speed (e.g., an idle speed of the engine) after an engine shutdown request and before engine speed is zero, the engine may be started without engaging the conventional starter motor so that torque from the engine may be delivered to the driveline sooner. Further, starting the engine via the ISG and closing the driveline disconnect clutch may improve engine starting consistency and reduce driveline torque disturbances.

Figure 5:
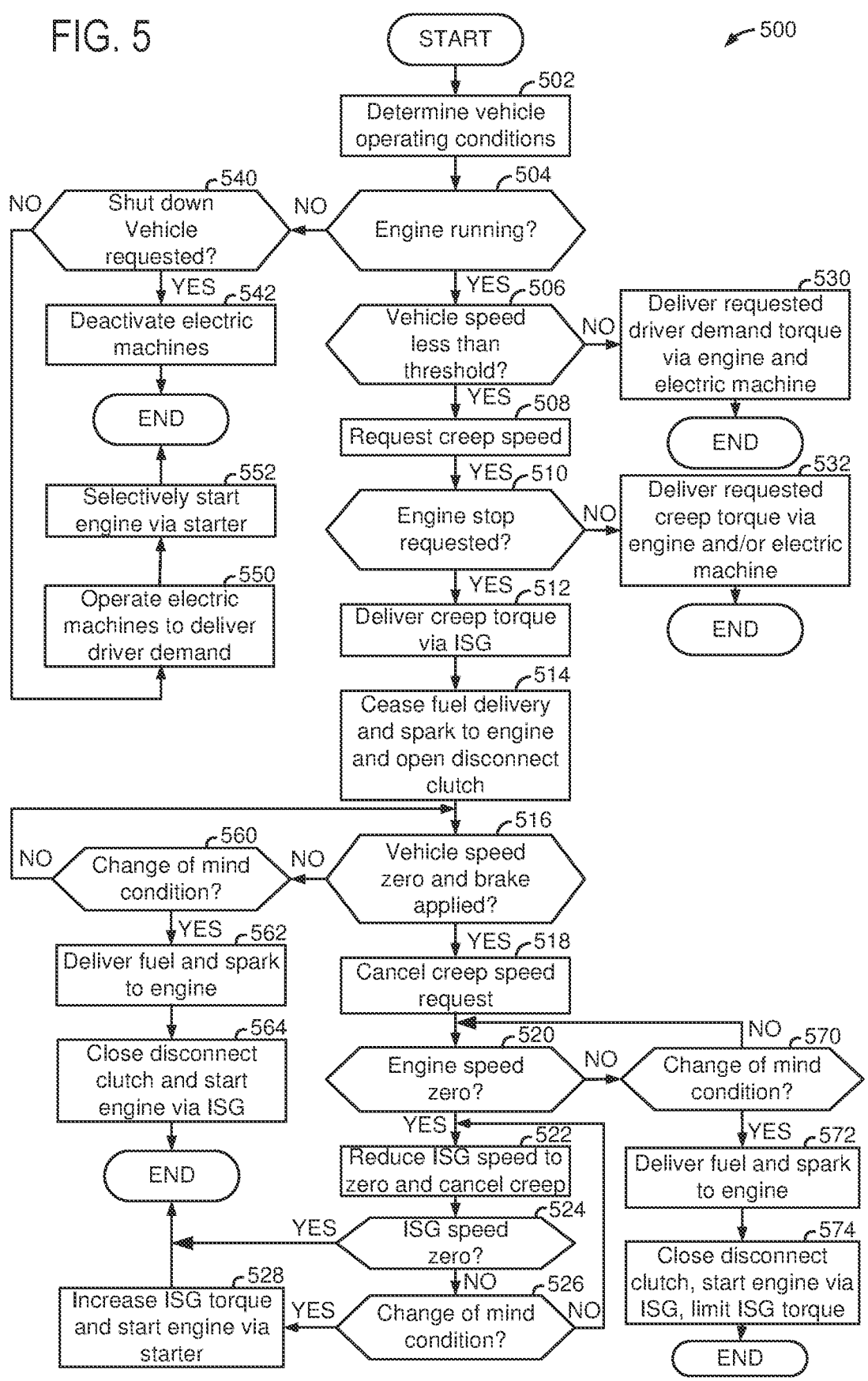
FIG. 5 shows a method for operating the hybrid vehicle.

Referring now to FIG. 5, a method for operating a hybrid vehicle is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequences shown in FIGS. 3 and 4.

At 502, method 500 determines vehicle operating conditions. Vehicle operating conditions may be determined via receiving inputs as shown in FIGS. 1 and 2 into a controller. Vehicle operating conditions may include but are not limited to engine operating state, catalyst temperature, ISG torque, driveline disconnect clutch state, ambient air temperature, engine speed, vehicle speed, and driver demand torque or power. Method 500 proceeds to 504 after vehicle operating conditions are determined.

At 504, method 500 judges whether or not the engine is running (e.g., rotating and combusting fuel). Method 500 may judge that the engine is running if engine speed is greater than a threshold engine speed and fuel is being injected to the engine. If method 500 judges that the engine is running, the answer is yes and method 500 proceeds to 506. Otherwise, the answer is no and method 500 proceeds to 540.

At 540, method 500 judges whether or not a vehicle shutdown is requested. A vehicle shut down may be requested via a human operator providing input to request a vehicle shut down. For example, a human operator may turn a key or press a pushbutton to request a vehicle shutdown. If method 500 judges that a vehicle shutdown has been requested, the answer is yes and method 500 proceeds to 542. Otherwise, the answer is no and method 500 proceeds to 550.

At 542, method 500 deactivates the electric machine (e.g., ISG 240). In one example, method 500 may remove electric power from the electric machine when a vehicle shutdown is requested. In addition, method 500 may also remove electric power from an inverter that supplies electric power to the electric machine. Method 500 proceeds to exit.

At 550, method 500 operates the electric machine to provide a requested driver demand power or torque. In one example, the driver demand power or torque is determined according to a position of a driver demand pedal and vehicle speed. Method 500 proceeds to 552.

At 552, method 500 selectively starts the engine via the conventional starter (e.g., 96 of FIG. 1). Method 500 may start the engine when driver demand torque or power exceeds a threshold torque or power amount or when battery state of charge is less than a threshold battery state of charge. The engine may be started via the conventional starter (e.g., 96 of FIG. 1) so that engine starting noise may be reduced. Method 500 proceeds to exit.

At 506, method 500 judges if vehicle speed is less than a threshold vehicle speed (e.g., 30 kilometers/hour). If so, the answer is yes and method 500 proceeds to 508. Otherwise, the answer is no and method 500 proceeds to 530.

At 530, method 500 delivers the requested driver demand torque or power via the engine and the electric machine. The particular portion of power or torque that the electric machine is tasked to provide may be a function of vehicle operating conditions such as but not limited to battery state of charge, battery temperature, and electric machine temperature. The engine may provide the torque or power to meet the driver demand torque or power that is not provided via the electric machine. Method 500 proceeds to exit.

At 508, method 500 requests that the engine and/or electric machine rotate at a speed that causes the vehicle to move at a predetermined creep speed (e.g., 5 kiometers/hour). In one example, the engine and/or electric machine are operated in a speed control mode and the engine and electric machine are commanded to a predetermined driveline creep speed (e.g., a speed in revolutions/minute) that causes the vehicle to travel at the predetermined creep speed when the transmission is in first gear while the brake pedal and driver demand pedal are fully released and while the vehicle is traveling on a flat road). In some examples, the electric machine may be operated in a speed control mode and the engine may be operated in a torque control mode so that the vehicle moves at the predetermined creep speed. In other examples, the engine may be operated in the speed control mode and the electric machine may operate in a torque control mode so that the vehicle moves at the predetermined creep speed. Method 500 proceeds to 510.

At 510, method 500 judges whether or not an engine stop is requested. An engine stop may be requested in response to a low driver demand torque or power and when vehicle speed is less than a threshold vehicle speed. Method 500 may also require additional conditions for the engine stop request to be generated. For example, method 500 may require that battery state of charge is greater than a threshold battery state of charge. If method 500 judges that an engine stop is requested, the answer is yes and method 500 proceeds to 512. Otherwise, the answer is no and method 500 proceeds to 532.

At 532, method 500 delivers the requested driver demand torque or power via the engine and the electric machine. The particular portion of power or torque that the electric machine is tasked to provide may be a function of vehicle operating conditions, such as, but not limited to battery state of charge, battery temperature, and electric machine temperature. The engine may provide the torque or power to meet the driver demand torque or power that is not provided via the electric machine. Method 500 proceeds to exit At 512, method 500 operates the electric machine (ISG 240) in a speed control mode and adjusts ISG torque so that the ISG rotates at a speed that causes the vehicle speed to equal the creep speed. Method 500 proceeds to 514.

At 514, method 500 ceases spark and fuel delivery to the engine. The spark and fuel delivery may be ceased after spark and fuel that has been started to be delivered is completely delivered for an engine cycle. In addition, method 500 may command open and open the driveline disconnect clutch so that the engine may rotate coast toward zero speed while the ISG is rotating at a speed the moves the vehicle at a desired creep speed. In some examples, the ISG may be rotated at an engine idle speed. Method 500 proceeds to 516.

At 516, method 500 judges whether or not vehicle speed is zero and if the brake pedal and vehicle brakes are applied. If so, the answer is yes and method 500 proceeds to 518. Otherwise, the answer is no and method 500 proceeds to 560. A yes answer may indicate that the human driver requests to reach engine and electric machine shut down conditions.

At 560, method 500 judges if operator change of mind conditions are present. Operator change of mind conditions may include but are not limited to one or more of at least partially releasing a brake pedal and/or at least partially applying a driver demand pedal. If one or more operator change of mind conditions are present, the answer is yes and method 500 proceeds to 562. Otherwise, the answer is no and method 500 returns to 516. Thus, if there are operating conditions that are indicative that the vehicle's human driver wishes not to stop the vehicle, method 500 proceeds to 562. Otherwise, if there are conditions that indicate that the human driver intends to stop the vehicle, method 500 returns to 516 so that the vehicle speed may continue to decline.

At 562, method 500 delivers fuel and spark to engine cylinders so that the engine may be restarted. Method 500 proceeds to 564.

At 564, method 500 closes the driveline disconnect clutch and transfers torque from the electric machine (e.g., ISG 240) to the engine. The torque may cause engine speed to increase so that the engine may be restarted at a speed where engine noise and vibration may be lower. Method 500 proceeds to exit.

At 518, method 500 generates a cancel creep speed request. The cancel creep speed request may not be acted upon or invoked while engine rotational speed is greater than zero revolutions/minute. When acted upon, the cancel creep speed request may operate to adjust ISG rotational speed to zero. Method 500 proceeds to 520.

At 520, method 500 judges if engine rotational speed is zero. If so, the answer is yes and method 500 proceeds to 522. Otherwise, the answer is no and method 500 proceeds to 570.

At 522, method 500 reduces the ISG speed to zero to cancel creep mode. Method 500 proceeds to 524.

At 524, method 500 judges if ISG speed is zero. If so, the answer is yes and method 500 proceeds to exit. Otherwise, the answer is no and method 500 proceeds to 526.

At 526, method 500 judges if operator change of mind conditions are present. If one or more operator change of mind conditions are present, the answer is yes and method 500 proceeds to 528. Otherwise, the answer is no and method 500 returns to 522.

At 528, method 500 increases ISG torque and/or power to meet the driver demand torque and/or power. In addition, method 500 may start the engine via cranking the engine via the conventional starter and supplying spark and fuel to the engine. Method 500 proceeds to exit.

At 570, method 500 judges if operator change of mind conditions are present. If one or more operator change of mind conditions are present, the answer is yes and method 500 proceeds to 572. Otherwise, the answer is no and method 500 returns to 520.

At 572, method 500 delivers fuel and spark to engine cylinders so that the engine may be restarted. Method 500 proceeds to 574.

At 574, method 500 closes the driveline disconnect clutch and transfers torque from the electric machine (e.g., ISG 240) to the engine. The torque may cause engine speed to increase so that the engine may be restarted at a speed where engine noise and vibration may be lower. In addition, method 500 may limit the torque output of the electric machine so that the speed of the ISG does not exceed a speed that moves the vehicle at the creep speed. For example, if ISG speed is 800 RPM when the vehicle moves at creep speed while the transmission is engaged in first gear, then torque output of the electric machine is held or limited below a torque that rotates the ISG at 800 RPM. Method 500 proceeds to exit.

In this way, a hybrid driveline may be controlled so that noise and vibration may be reduced during conditions when an engine is restarted before the engine stops rotating after being shut down. The engine may be started by an ISG that is rotating at a speed that may maintain vehicle speed at a desired speed, which may improve engine starting consistency.

Thus, the method of FIG. 5 provides for a method for operating a vehicle, comprising: shutting down an engine via a controller in response to an engine shutdown request; and inhibiting stopping rotation of an integrated starter/generator (ISG) after the engine shutdown request via the controller while the vehicle is stopped and a speed of the engine is greater than a threshold speed. In a first example, the method includes where the threshold speed is zero. In a second example that may include the first example, the method further comprises operating the ISG in a speed control mode while inhibiting stopping of the ISG. In a third example that may include one or more of the first and second examples, the method further comprises reducing speed of the ISG to zero in response to the speed of the engine being less than or equal to the threshold speed. In a fourth example that may include one or more of the first through third examples, the method further comprises rotating the ISG at predetermined speed. In a fifth example that may include one or more of the first through fourth examples, the method includes where the predetermined speed is a creep speed. In a sixth example that may include one or more of the first through fifth examples, the method further comprises opening a driveline disconnect clutch in response to the engine shutdown request. In a seventh example that may include one or more of the first through sixth examples, the method further comprises starting the engine via engine via a starter motor after engine speed reaches zero.

The method of FIG. 5 also provides for a method for operating a vehicle, comprising: shutting down an engine and opening a driveline disconnect clutch via a controller while the vehicle is moving via the controller in response to an engine shutdown request; rotating an integrated starter/generator (ISG) at a creep speed while operating the ISG in a speed control mode; generating a creep cancel request via the controller in response to a speed of the vehicle being zero; and inhibiting stopping rotation of the ISG after the engine shutdown request via the controller while the vehicle is stopped and a speed of the engine is greater than a threshold speed. In a first example, the method further comprises stopping rotation of the ISG in response to engine speed being zero. In a second example that may include the first example, the method further comprises restarting the engine in response to at least partially releasing a brake pedal or application of a driver demand pedal. In a third example that may include one or more of the first and second examples, the method further comprises operating the ISG in a torque control mode in response to at least partially releasing the brake pedal or application of the driver demand pedal. In a fourth example that may include one or more of the first through third examples, the method further comprises preventing torque output of the ISG from exceeding a torque that rotates the ISG at the creep speed.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
shutting down an engine via a controller in response to an engine shutdown request;
inhibiting stopping rotation of an integrated starter/generator (ISG) after the engine shutdown request via the controller while the vehicle is stopped and a speed of the engine is greater than a threshold speed;
reducing speed of the ISG to zero in response to the speed of the engine being less than or equal to the threshold speed; and
rotating the ISG at a predetermined speed prior to reducing speed of the ISG to zero in response to speed of the engine being less than or equal to the threshold speed.

2. The method of claim 1, where the threshold speed is zero.

3. The method of claim 1, further comprising operating the ISG in a speed control mode while inhibiting stopping of the ISG.

4. The method of claim 3, further comprising cancelling a creep request in response to vehicle speed being zero and a brake pedal being applied.

5. The method of claim 1, where the predetermined speed is a creep speed.

6. The method of claim 1, further comprising opening a driveline disconnect clutch in response to the engine shutdown request.

7. The method of claim 1, further comprising starting the engine via a starter motor that selectively engages a flywheel after engine speed reaches zero while the ISG is rotating.

8. A system, comprising:
a vehicle including an engine;
an integrated starter/generator (ISG);
a driveline disconnect clutch positioned in a driveline between the engine and the ISG;
a brake pedal;
a flywheel;
a controller including executable instructions stored in non-transitory memory that cause the controller to inhibit stopping rotation of the ISG in response to an engine stop request while the vehicle is stopped and engine speed is above a threshold speed, additional instructions to generate a creep cancel request in response to a speed of the vehicle being zero and the brake pedal being applied, and additional instructions to start the engine via a starter motor that selectively engages the flywheel after engine speed reaches zero while the ISG is rotating.

9. The system of claim 8, further comprising additional instructions that cause the controller to restart the engine in response to at least partially releasing the brake pedal.

10. The system of claim 8, further comprising a driver demand pedal and additional instructions that cause the controller to restart the engine in response to at least partially applying the driver demand pedal.

11. The system of claim 8, further comprising additional instructions for rotating the ISG at a creep speed.

12. The system of claim 8, further comprising additional instructions for closing the driveline disconnect clutch while delivering a creep torque via the ISG in response to applying a driver demand pedal.

13. The system of claim 8, further comprising reducing a speed of the ISG to zero in response to engine speed being zero.

14. The system of claim 13, further comprising withdrawing the creep cancel request in response to at least partially releasing a brake pedal.

15. A method for operating a vehicle, comprising:
shutting down an engine and opening a driveline disconnect clutch via a controller while the vehicle is moving via the controller in response to an engine shutdown request;
rotating an integrated starter/generator (ISG) at a creep speed while operating the ISG in a speed control mode;
generating a creep cancel request via the controller in response to a speed of the vehicle being zero;
inhibiting stopping rotation of the ISG after the engine shutdown request via the controller while the vehicle is stopped and a speed of the engine is greater than a threshold speed; and
starting the engine via a starter motor that selectively engages a flywheel after the speed of the engine reaches zero while the ISG is rotating.

16. The method of claim 15, further comprising stopping rotation of the ISG in response to engine speed being zero.

17. The method of claim 16, further comprising restarting the engine in response to at least partially releasing a brake pedal or application of a driver demand pedal.

18. The method of claim 17, further comprising operating the ISG in a torque control mode in response to at least partially releasing the brake pedal or application of the driver demand pedal.

19. The method of claim 18, further comprising preventing torque output of the ISG from exceeding a torque that rotates the ISG at the creep speed.

* * * * *